Figure 5:
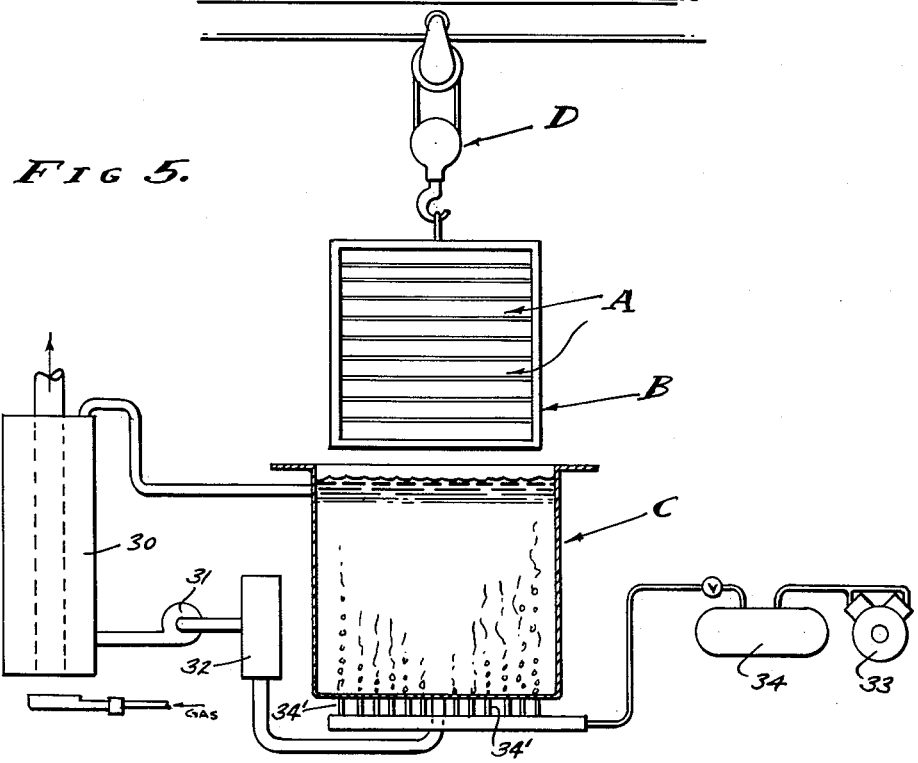

May 12, 1964          N. P. NILSEN          3,132,735
APPARATUS FOR PROCESSING EGGS
Filed Dec. 19, 1960          3 Sheets-Sheet 1
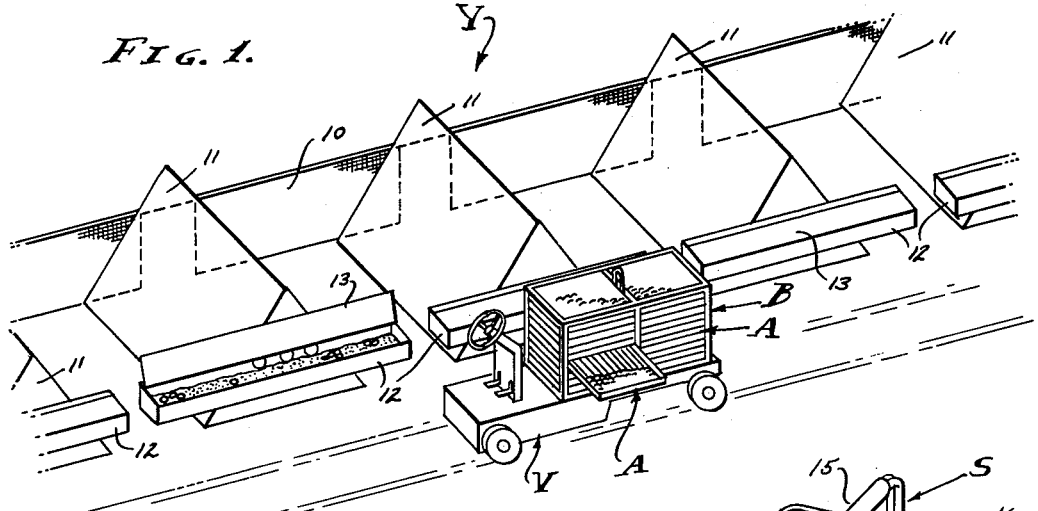
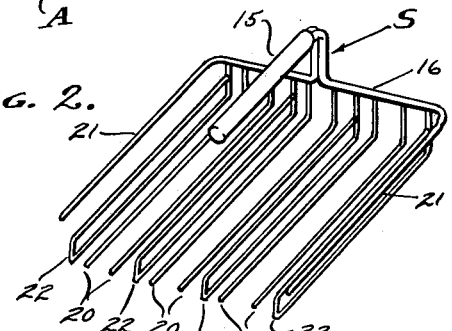
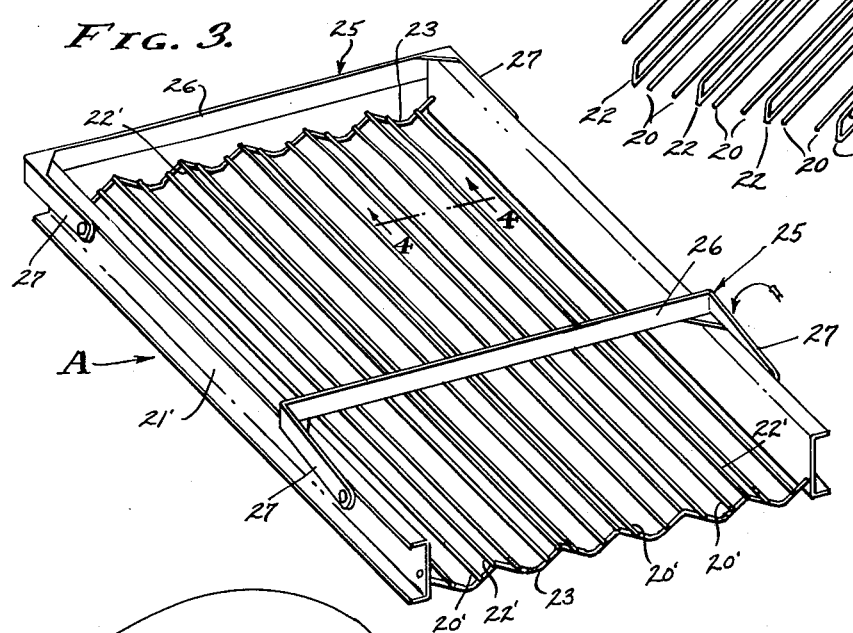
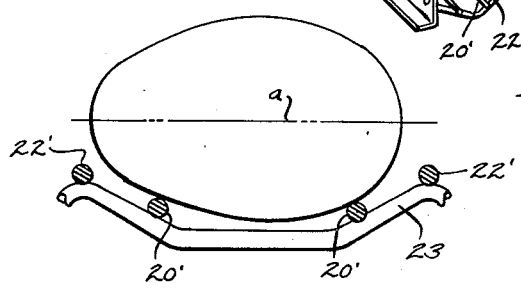
INVENTOR.
NORMAN P. NILSEN
BY
W. H. Maxwell
AGENT May 12, 1964  N. P. NILSEN  3,132,735
APPARATUS FOR PROCESSING EGGS
Filed Dec. 19, 1960  3 Sheets-Sheet 2

INVENTOR.
NORMAN P. NILSEN
BY
Wm. H. Maxwell
AGENT

May 12, 1964  N. P. NILSEN  3,132,735
APPARATUS FOR PROCESSING EGGS
Filed Dec. 19, 1960  3 Sheets-Sheet 3
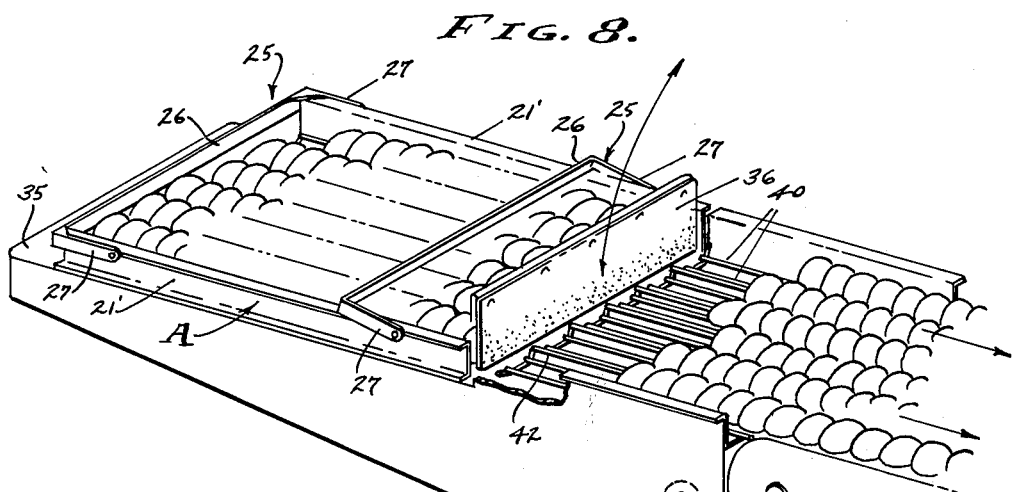
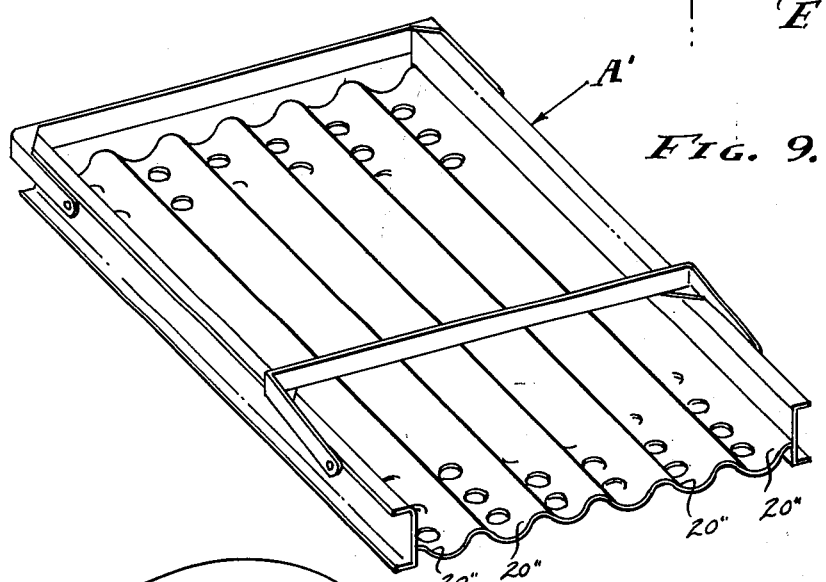
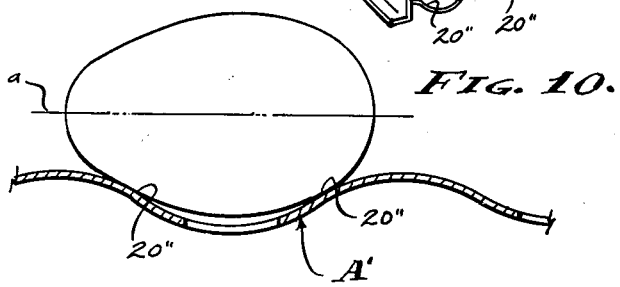
INVENTOR.
NORMAN P. NILSEN
BY
Wm. H. Maxwell
AGENT

United States Patent Office 3,132,735
Patented May 12, 1964

3,132,735
APPARATUS FOR PROCESSING EGGS
Norman P. Nilsen, P.O. Box 33, Phelan, Calif.
Filed Dec. 19, 1960, Ser. No. 76,848
6 Claims. (Cl. 198—43)

This invention relates to the production of eggs by poultry and it is particularly concerned with an improved and highly efficient method and apparatus for mass handling of eggs as they are produced.

Needless to say, freshness of eggs is important together with the economics of the egg industry which is highly competitive. Therefore, it is imperative that absolutely fresh and high quality eggs be produced, and this requires expeditious handling of the production. So far as feeding and poultry hygiene is concerned, good practices should be followed and assuming that the poultry is laying satisfactorily, then the method and apparatus that I provide can be used to great advantage.

Heretofore, and generally speaking poultry is handled so that the hens lay in nests from which the individual eggs must be extracted by hand, which is costly. In some methods cages are used, for example, one for each individual fowl, together with conveyor means, accompanied by breakage of eggs. Following collection of eggs from the nests it is common to carry them in baskets or buckets, or in egg flats, then to a cleaning and candling facility. The eggs are transferred and sorted by hand, taking them from the buckets, washing them manually, and candling them manually, all one at a time, and after which they are individually placed in boxes for sale. However, it is improved practice to manually place the eggs upon a conveyor that passes over a candling zone and through a washer and drier and sorter. At the end of the conveyor the eggs are manually transferred to boxes or crates. Further improvement has been made by employing multi-row conveyors and lifting devices that raise the eggs, say one dozen eggs at a time, from the conveyor to be then dropped into boxes or crates.

From the foregoing, it is apparent that advancement has been made in this art, however, it is to be noted that, nevertheless, it is now common practice to individually handle eggs and to manipulate them in very small groups of say twelve to thirty eggs. Furthermore, manpower is not economically used with the common methods and apparatus, said common methods and apparatus requiring a multitude of manual operations that result in inefficiencies and in a high breakage factor, all due to human error. Also, working conditions and morale of manpower are to be considered, all of which is hindered by awkward and inefficient methods and apparatus, and all of which is reflected in the economy of producing marketable eggs.

A general object of this invention is to provide a method and an apparatus for carrying out said method whereby the production of eggs by poultry is handled in a most advantageous, efficient and profitable manner.

It is an object of this invention to provide a method whereby manual contact with the production of eggs by poultry is reduced to a minimum, and wherein the number of manual operations involved is also reduced to a minimum.

It is another object of this invention to provide a method whereby relatively large numbers of eggs as produced by poultry are handled at each step of said method, virtually eliminating individual egg handling and speeding up the process to maximum output.

It is still another object of this invention to provide means whereby a plurality of eggs is collected from the nest with the effort of but one single manual operation. With the present invention, apparatus in the form of a scoop is provided and which is manually passed through the nest for the collection of eggs, as many as about twenty eggs at a time.

An object of this invention is to provide a means whereby a multiplicity of eggs is arranged, after collection thereof, for mass or batch handling. With the present invention, apparatus in the form of a conveyor tray is provided and which has a manifold purpose. Firstly, said tray has utility in receiving a plurality of collected eggs. Secondly, said tray automatically arranges the eggs in a predetermined fashion. Thirdly, a plurality of trays is easily transported. Fourthly, said plurality of trays is inherently adapted to batch washing. Fifthly, said trays are adapted to be cooperatively related to a conveyor in order to transfer eggs to the latter; and sixthly, said trays are also adapted to receive eggs from the said conveyor so as to act in the capacity of flats.

Another object of this invention is to provide an article or apparatus that I will term a conveyor tray, having the utilitarian advantages enumerated above, and which functions to align eggs in multi-rows, for example, in six rows of about twenty eggs each.

Another object of this invention is to provide an apparatus wherein batch washing of eggs is made practical. The apparatus that I provide involves a rack into which a plurality of trays is supported, for example, ten trays high and each tray of about one hundred eggs each, and so that approximately one thousand eggs or more are washed simultaneously.

Another object of this invention is to provide an apparatus wherein prearranged rows of eggs, for example, six rows, are transferred onto a continuously moving conveyor, all without interruption. I mean by this that trays of one hundred or more eggs are each arranged by a single manual operation so as to transfer said eggs onto said conveyor.

It is still another object of this invention to provide means in connection with said conveyor tray that retains the eggs therein, and also to provide means whereby the eggs when released from the tray are allowed to move gently ahead to meet with the rearmost eggs being advanced by the conveyor.

Figure 6:
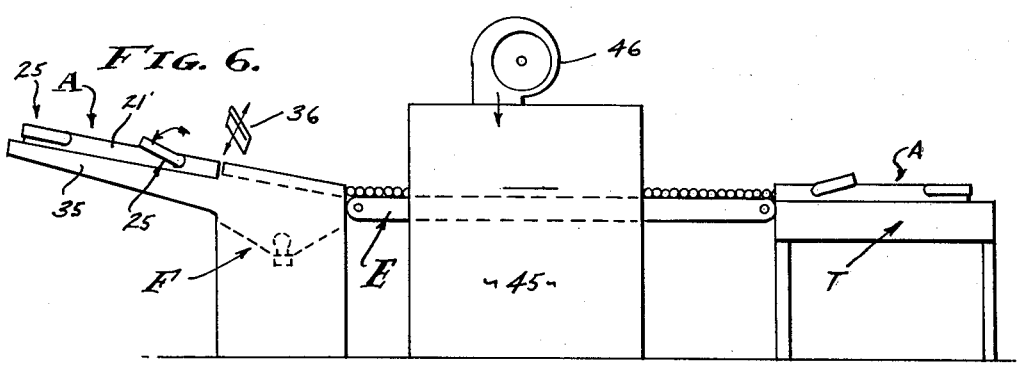
Figure 7:
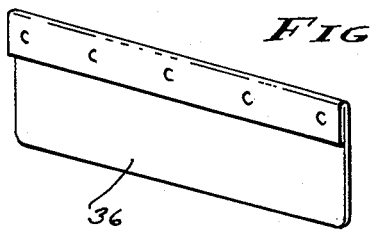

The various objects and features of this invention will be fully understood from the following detailed description of the typical preferred forms and applications thereof, throughout which description reference is made to the accompanying drawings, in which:

FIG. 1 is a perspective view showing the initial steps of the method involved and the apparatus used in connection therewith. FIG. 2 is a perspective view showing the scoop that I provide in carrying out the first step of the method. FIG. 3 is a perspective view showing the tray that I provide and which is used throughout the method involved. FIG. 4 is an enlarged sectional view of a portion of the tray and taken as indicated by line 4—4 on FIG. 3. FIG. 5 is a diagrammatic view of the washing step involved in carrying out the method. FIG. 6 is a side elevation of the tray of the present invention and showing its cooperative engagement with the conveyor that is used in the process involved. FIG. 7 is a perspective view of the divider used as shown in FIG. 6 and which is manipulated as circumstances require. FIG. 8 is a perspective view of a portion of the apparatus as shown in FIG. 6, and FIGS. 9 and 10 are views of a modified form of the invention and similar to FIGS. 3 and 4, respectively.

The method of handling egg production of poultry that I provide is unique in that it involves little or no manual touching of eggs and a minimum of manual operation. Basically, the eggs are manually operated upon but twice, first to collect them, and second, to install them on a conveyor tray. However, other steps and/or activities are resorted to in order to completely process the eggs, namely the steps of washing, candling, drying, and sorting for size. The latter mentioned steps can be carried out mechanically and for that reason I consider the said first two mentioned steps as the only necessary manual operations to be carried out, with or without help of mechanics. Further, it is to be understood that defective eggs are manually removed from the processing, as circumstances require and in the usual manner.

In order to carry out the method herein disclosed it is necessary to utilize certain pieces of apparatus or the equivalent thereof. To begin with, I prefer to enclose a flock of fowl in an open pen or yard Y enclosed by a fence 10. The ground is dry and the fowl are suitably fed and watered. Along one or more sides of the yard Y I provide coops 11 for housing the fowl, and a place where they can readily roost. In accordance with the method, I provide a nest 12 at each coop 11, the coops being arranged in a row, and the nests 12 being at a common end of the coops and aligned to form a series of nests, one adjacent to the end of the other. The fronts of the coops are normally open (indicated by dotted lines) while the sides and backs are closed. It is significant that the nests be arranged as specified in order to facilitate collection of eggs as later described. Furthermore, it is a feature that the nests are such as to invite the fowl to lay there, to the virtual exclusion of the coop interior or yard. As shown, the nest 12 is a horizontally disposed box with a lid 13 coextensively hinged thereto for complete access to the nest. The fowl have access to the interior of the nest by means of rather small openings that communicate with the interior of the coop (see FIG. 1). Since the nest is made of imperforate elements it is dark within, and this darkened condition is inviting to the fowl and is conducive for laying purposes. The nest is filled with a layer of straw or the like, for example, rice hulls.

With the yard Y related to the coops 11 and nests 12, as above described, laying takes place only within the nests 12 that are accessible at the rear of the coops and outside the fence 10. Although the fowl may be laying in the nest, it is a simple matter to drive them into the coop 11 by approaching the nest and rapping thereon. When the fowl have removed themselves from the nest, which is a matter of but a few seconds, the lid 13 is lifted, thereby exposing any and all of the eggs that have been laid. In practice, it is normal to find three or four dozen eggs in one nest, said nests being sized and propositioned as shown in the drawings.

In order to extract the eggs from the nest without picking them up individually I provide a scoop S adapted to be manually entered into the nest to collect the eggs laid therein, and thereby accomplishing the first manual operation of the method. The scoop S is an egg collector and is characterized by its forked shape involving forwardly projecting tines 14 carried by a handle 15. The handle 15 carries a support 16 from which the tines 14 depend and then curve to extend forwardly and function to align the eggs in one or more rows. In order for the scoop S to have the functional feature of egg alignment, the tines 14 are in the form of egg supporting tracks 20 and egg divider tracks 22. It is found practical to employ three sets of tracks 20 and with a track 22 at each side of the said sets of tracks 20. The scoop S is essentially flat, in that the sets of tracks are arranged in coplanar relationship with said tracks 20 and 22 extending longitudinally from a closed back established by the support 16 and upstanding portions of the tracks that join to the said support. The tracks 20 and 22 are straight and freely extending and terminate at the open front of the scoop. The support 16 is extended into spaced parallel sides 21 that embrace the collected eggs, and the handle 15 is extended forwardly to overlie the scoop S and so that the said scoop is substantially balanced from said handle.

In accordance with the present invention, the tracks 20 of the scoop S provide spaced and parallel runner supports for the eggs, and they are in the form of rods that are straight and round in cross-section and spaced about one inch apart for handling normal sized eggs of laying hens. In this case, each set or pair of tracks is spaced two and eleven-sixteenth inches, on centers, and the divider track 22 is preferably intermediate each pair of tracks 20. As shown, the divider track 22 has a lower runner portion in the same plane as the tracks 20 and has a raised portion slightly higher than said plane, about three-eighths or one-half inch higher. When the said scoop S is passed through the loose rice hulls or shavings, as above specified, the eggs are collected and ride on the track 20 between the tracks 22, and with the scoop that I have shown as many as twenty eggs are collected and aligned at each manual operation, all without manually touching thereof.

The first step of the method involves the collection of a plurality of eggs by a single manual operation, each nest 12 requiring one or more passes therethrough with the scoop S. The lid 13 is then closed, the collected eggs being deposited on a conveyor tray A in accordance with the second step of the method, that is the collected pluralities of eggs are aggregated by depositing them on the tray, or trays, A, whereby a multiplicity of eggs is established for further handling. In practice, it has been found that a tray A of one hundred, or slightly more, eggs is comfortable for a person to lift and conveniently handle, being approximately ten pounds in weight, and therefore the tray A is limited in size to accommodate said approximate number of eggs.

The conveyor trays A are alike and they are stored in a rack B, each tray A forming a drawer in the rack B. A suitable vehicle V, that is self-propelled, is used to transport the rack B alongside the nests 12, and the trays are withdrawn from the rack, as are drawers, in order to be filled with eggs. In practice, for example, the rack is provided with two tiers of openings with ten openings in each tier. Also, each of said openings has guides to direct the trays so that they remain substantially horizontal at all times. However, when extended for receiving eggs, the outer extended end of the tray drops so that it is on a slight decline. Thus, the eggs when deposited in the tray A flow to the lowermost end thereof (see FIG. 1). Obviously, the trays are drawn out of the rack, as are drawers, and when filled with eggs they are returned to a position within the rack.

In order for the conveyor tray A to have the functional features enumerated in the objects above, one or more sets of tracks 20' are provided therein and which characterize the same. The tray A is a flat rectangular element with longitudinally extending sets of tracks 20', and with closure means 25 at its opposite ends. In order for the tray A to slide into and out of the rack B, as a drawer, it has sides 21' of substantial vertical extent and with parallel upper and lower edges for sliding engagement in the rack guides. The front and rear ends of the tray A are open and being alike they are closed by like or identical means 25. The closure means 25 is essentially a shiftable end in the form of a transverse member 26, preferably carried by pivotal arms 27 pinned to the sides 21'. In one position the member 26 overlies the end of the tray A while in the other position it rests upon the upper edges of the sides.

In accordance with the present invention, the tracks 20' of the tray A provide spaced and parallel runner supports for the eggs. The said tracks form a bottom and in one form of the invention (see FIG. 9) the tracks 20" of the tray A' are formed by a corrugated sheet of material that is perforated for washing, etc. However, the tracks may be formed of elongate rods that are straight and round in cross-section, these rods being spaced one inch apart for handling normal sized eggs of laying hens. In this case, each set or pair of tracks is spaced about two and eleven-sixteenths inches apart, on centers, and I prefer to provide a divider track 22' intermediate each pair of tracks 20'. The tracks 20' are in the same horizontal plane, there being six sets of tracks, and the tracks 22' are slightly higher, about three-eighths or one-half inch higher, than the plane of the first mentioned tracks. The tracks 20′ and 22′ are supported by underlying rods 23 at the ends of the tray, said rods 23 being suitably bent to position the tracks as shown and specified.

The said second step of the method involves the deposit of eggs in the trays A whereby said eggs are automatically oriented into separate rows and with their major axes *a* parallel. An egg is an elliptical solid, round in cross-section and with opposite ends of slightly different radii. It is natural for an egg to roll on its round cross-sectional configuration and with the tracks 20, 20′ and 20″ that I provide the eggs immediately drop between the said tracks and seek this natural rolling alignment, with the major longitudinal axes of the eggs parallel with each other. Following the first step of the process, the second step is accomplished by gently rolling the eggs from the scoop S, using a hand to damp any rapid movement. The eggs, as they enter onto the tray A, roll from the tracks 20 and necessarily seek one set of tracks 20′ and are guided onto a set of tracks by a track 22′. Since the tray A is slightly inclined to receive the eggs, it is readily apparent that they flow to one end of the tray and progressively fill said tray. Proper rolling alignment of the eggs is further assisted by some manual rolling and aligning and by normal vibration of the vehicle in moving over imperfect ground, and as a result each tray when filled to capacity has the rows of eggs, six rows, properly positioned for gravity flow and further processing.

The third step of the method involves the washing of the eggs that have been collected by the scoops S and positioned by the trays A. In order to advantageously employ the trays A, as above described, I employ a batch washing operation, it being understood that a common conveyor type washer can be fed by the trays, as will become apparent. However, the batch washing has the advantage of mass washing of an entire rack of eggs, for example, in excess of two thousand eggs per batch, and this can be accomplished in a matter of about sixty to ninety seconds. In accordance with the third step of the method the entire rack B of twenty trays A is lowered into a vessel C by means of a hoist D. The hoist D is preferably a transporting type hoist, as for example, an overhead monorail unit that is adapted to lift the rack B from the vehicle V and move it to the vessel C, after which it is again lifted and moved to the vicinity of step four of the method as later described.

In order to batch wash the eggs, the rack B and trays A carried thereby are all immersed into a washing liquid within the vessel C. The said liquid can be a solution of water and a suitable detergent, said water being heated by a boiler 90 to 120° F. and circulated through the vessel C by a pump 31 and through a filter 32. In order to gain a scrubbing action compressed air is supplied by a pump 33 through a pressure regulated reservoir 34 and discharged by a multiplicity of jets 34′ occupying the area of the bottom of the vessel. The said air works its way by and through the trays A of eggs, the rack B being an open frame-like structure so as to avoid interference with the flow of air. The air moving upwardly thereby agitates the eggs and the eggs emerge from this washing step substantially clean and ready for further handling.

The fourth step of the method involves the removal of the trays A from the rack B and their installation on the feeder 35 of a conveyor E. This step also involves the above mentioned second manual operation and wherein one hundred to one hundred and twenty eggs are transferred by each manual operation, onto the conveyor E for candling and drying.

However, in the case under consideration, the eggs are cleaned before candling so that the conveyor E has utility in the candling and/or drying steps. As shown, the feeder 35 of the conveyor is a flat declined apron element that pitches forwardly in the direction of movement of the eggs, so that the eggs will roll forwardly by the action of gravity. The conveyor E is designed to convey multirows of eggs, for example, six rows, and it is horizontally disposed. Therefore, the feeder 35 is of the same width as the conveyor in order to support the trays A of corresponding width adjacent the receiving end of the conveyor E.

The candling means F is preferably intermediate the feeder 35 and conveyor E and is simply a light box that underlies the rows of eggs as they pass onto the conveyor E from the trays A. The candling means F forms a continuation of the trays A and is disposed on a declined plane with tracks 40 and 42 forming continuations of the tracks 20′ and 22′, respectively. When the trays A are manually placed upon the feeder 35, the eggs roll onto the candling means track 40 and then onto the conveyor E. In practice, the tracks 40 and 42 can be directed to change the lateral spacing of the rows of eggs, all as circumstances require.

In order to complete the fourth step of transferring the eggs onto the conveyor E, the forwardmost transverse member 26 is raised allowing the eggs to roll forwardly from the tray A. However, prior to lifting of said transverse member 26, a divider 36 is placed ahead of the eggs on the tray, and said divider, which is a manually operated part of the apparatus, is moved ahead until the eggs roll into position adjacently behind the eggs left by the preceding tray. The divider is preferably made of a panel of soft pliant material, wide enough to substantially traverse the tray between the sides 21′ thereof.

As the eggs roll over the tracks 40 and 42 they are visually observed by the person who places the trays in position, and as soon as one tray A is emptied another tray is readily put into its place and manual use of the divider 36 repeated, as above described. From tracks 40, 42 the eggs roll on a conveyor E.

Operation of the conveyor E carries the rows of eggs through a housing 45 where air is blown in order to dry the eggs. The housing 45 supports a blower 46 and the conveyor E operates through the housing to project from opposite ends thereof. At the end of the housing 45 opposite the feeder 35 sorting and boxing of the eggs may take place, and at this point the final and fifth step of the method is accomplished using the trays A, which are now employed as continuations of the conveyor E on the table T. This last step is carried out manually, for the most part, the eggs being assisted to move forwardly, at which time they are finally inspected and sorted, care being exercised so that the eggs do not discharge from the end of the conveyor E without a tray in position to receive them, as shown. Alternatively, the eggs are sized and placed in boxes or flats, instead of being stored in said trays A.

From the foregoing it will be apparent that I have provided a method and apparatus for processing eggs in a most efficient manner and wherein manual operations are minimized. By employing the coop and nest arrangement together with the manipulation of the scoop S, all as above specified, pluralities of eggs are initially gathered and immediately aligned in rows and thereafter are temporarily stored on the trays A which characterize the method and apparatus. Said scoop S and trays A are such that the eggs are automatically oriented and aligned so that they will roll when the trays are cooperatively related to a conveyor and the eggs released. A feature of the method is the use of the divider 36 which is employed to prevent rapid movement of the eggs in rolling forwardly on the tracks 40 and 42, over the candling means F. By providing multi-row scoops and trays, as shown and described, a sufficient number of eggs is conveniently stored and handled and fed onto a conveyor E of practical width. As a result, the eggs are continuously processed without interruption, without breakage, and with sufficient time for personnel to maintain a high degree of quality control.

Having described only the typical preferred forms and applications of my invention, I do not wish to be limited Having described my invention, I claim:

1. A conveyor tray for use in processing eggs as they are produced by laying hens and including, a plurality of sets of longitudinally extending tracks with supporting surfaces disposed in a common plane, each set of tracks comprising a pair of unobstructed runners that are parallel and horizontally disposed in order for the eggs to roll thereon in a series, and a closure means at one end of the tray and comprising a transverse member shiftable into and out of position to releasably obstruct rolling of the eggs.

2. A conveyor tray for use in processing eggs as they are produced by laying hens and including, a plurality of sets of longitudinally extending tracks with supporting surfaces disposed in a common plane, each set of tracks comprising a pair of unobstructed runners that are parallel and horizontally disposed in order for the eggs to roll thereon in a series, and an unobstructed divider runner intermediate each set of first mentioned runners and spaced above the said common plane.

3. A conveyor tray for use in processing eggs as they are produced by laying hens and including, a plurality of sets of longitudinally extending tracks with supporting surfaces disposed in a common plane, each set of tracks comprising a pair of unobstructed runners that are parallel and horizontally disposed in order for the eggs to roll thereon in a series, a closure means at one end of the tray and comprising a transverse member shiftable into and out of position to releasably obstruct rolling of the eggs, and an unobstructed divider runner intermediate each set of first mentioned runners and spaced above the said common plane.

4. In combination, a plurality of conveyor trays and a rack therefor, said rack comprising a tier of guides for the reception of said plurality of trays, and said trays each comprising a set of open-ended tracks that are parallel and horizontally disposed in order for the eggs to roll thereon in a series, and a closure means at and removable from one end of the tray in order to releasably obstruct rolling of the eggs.

5. In combination, a plurality of conveyor trays and a rack therefor, said rack comprising a tier of guides for the reception of said plurality of trays, and said trays each comprising a plurality of sets of longitudinally extending open-ended tracks with supporting surfaces disposed in a common plane, said tracks being parallel and horizontally disposed in order for the eggs to roll thereon in a series, and a closure means at one end of the tray and comprising a transverse member shiftable into and out of position to releasably obstruct rolling of the eggs.

6. In combination with an egg processing machine comprising a feeder and with egg supporting tracks adjacent to and contiguous with a power conveyor for transporting eggs, a conveyor tray for delivering eggs to said conveyor, said conveyor being driven to receive and transport eggs on a horizontal plane, and said conveyor tray being positioned adjacent the said first mentioned tracks and said tray comprising a set of open-ended tracks that are normally horizontally disposed and that are declined by pitching the tray in order for the eggs to roll in a series therefrom and onto the first mentioned tracks, there being a closure means at the end of the tray and comprising a transverse member shiftable into and out of position to releasably obstruct rolling of the eggs, and a divider removable from between the eggs on the tray and eggs previously on the first mentioned tracks and manually operable to retard rolling of said eggs from the tray.

References Cited in the file of this patent

UNITED STATES PATENTS

| | | |
|---|---|---|
| 1,149,103 | Webster | Aug. 3, 1915 |
| 2,085,670 | Peters | June 29, 1937 |
| 2,176,913 | Mandel | Oct. 24, 1939 |
| 2,267,473 | Markey | Dec. 23, 1941 |
| 2,511,560 | Bechmann | June 13, 1950 |
| 2,555,193 | Johnson | May 29, 1951 |
| 2,661,103 | Fay et al. | Dec. 1, 1953 |
| 2,750,293 | Burmeister | June 12, 1956 |
| 2,760,743 | Shaw | Aug. 28, 1956 |
| 2,886,001 | Kitson | May 12, 1959 |
| 2,923,631 | Kauffman et al. | Feb. 2, 1960 |
| 2,924,342 | Jean et al. | Feb. 9, 1960 |
| 2,944,696 | Effgen | July 12, 1960 |

FOREIGN PATENTS

| | | |
|---|---|---|
| 992,704 | France | July 11, 1951 |
| 17,488 | Great Britain | July 23, 1914 |